US006317114B1

(12) United States Patent
Abali et al.
(10) Patent No.: US 6,317,114 B1
(45) Date of Patent: Nov. 13, 2001

(54) METHOD AND APPARATUS FOR IMAGE STABILIZATION IN DISPLAY DEVICE

(75) Inventors: Bulent Abali, New York; Hubertus Franke, Cortlandt Manor; Mark E. Giampapa, Irvington, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/239,830

(22) Filed: Jan. 29, 1999

(51) Int. Cl.[7] ............................ G09G 5/34; H04N 5/228

(52) U.S. Cl. ............................................ 345/121; 348/208

(58) Field of Search .................................... 348/208, 511, 348/745, 747; 345/121

(56) References Cited

U.S. PATENT DOCUMENTS

| | | | | |
|---|---|---|---|---|
| Re. 36,145 | * | 3/1999 | DeAguiar et al. | 345/511 |
| 3,766,787 | * | 10/1973 | Irvine | 73/514.02 |
| 4,095,547 | * | 6/1978 | Benington | 114/122 |
| 4,403,256 | * | 9/1983 | Green et al. | 348/208 |
| 5,032,907 | * | 7/1991 | Isnardi | 348/434.1 |
| 5,053,875 | * | 10/1991 | Ishii et al. | 348/208 |
| 5,282,044 | * | 1/1994 | Misawa et al. | 348/208 |
| 5,438,360 | * | 8/1995 | Edwards | 348/208 |
| 5,497,191 | * | 3/1996 | Yoo et al. | 348/208 |
| 5,497,192 | | 3/1996 | Ishizuka . | |
| 5,502,484 | * | 3/1996 | Okada | 348/208 |
| 5,561,498 | * | 10/1996 | Sekine et al. | 396/53 |
| 5,745,173 | * | 4/1998 | Edwards et al. | 348/208 |
| 5,786,824 | * | 7/1998 | Sevigny | 345/438 |
| 5,874,958 | * | 2/1999 | Ludolph | 345/339 |
| 5,926,212 | * | 7/1999 | Kondo | 348/208 |
| 6,172,707 | * | 1/2001 | Ouchi et al. | 348/208 |

FOREIGN PATENT DOCUMENTS

| | | |
|---|---|---|
| 7-36421 | 2/1995 | (JP) . |
| 7-261720 | 10/1995 | (JP) . |
| 7-261727 | 10/1995 | (JP) . |
| 9-190168 | 7/1997 | (JP) . |

* cited by examiner

*Primary Examiner*—Jeffery Brier
*Assistant Examiner*—Ryan Yang
(74) *Attorney, Agent, or Firm*—Gail H. Zarick, Esq.; McGinn & Gibb, PLLC

(57) ABSTRACT

An image stabilizing apparatus and method for a display device having a display screen, include a sensor for sensing a movement of the display device, and a movement compensation circuit, operatively coupled to the sensor, for compensating for the movement of the display device such that an image on the display screen of the display device remains substantially stationary in relation to an observer's gaze.

20 Claims, 5 Drawing Sheets

METHOD AND APPARATUS FOR IMAGE STABILIZATION IN DISPLAY DEVICE

BACKGROUND OF THE INVENTION

1. Field of the Invention

The present invention generally relates to a method and apparatus for stabilization of an image, and more particularly to a video signal processing circuit and method used in performing vibration correction for an image on a display device.

2. Description of the Related Art

In recent years, electronic equipment including a display (e.g., such as a palmtop/laptop computer display, video games, televisions, display monitors, etc.) have become miniaturized and hence portable so that such equipment can be taken virtually anywhere and such equipment can be operated in virtually any environment including moving vehicles, boats, airplanes, etc.

In a moving vehicle such as an automobile, a disadvantage of viewing, for example, a laptop computer's display, such as for the IBM Thinkpad®, is the eye strain caused by vibrations and jitter of the vehicle. Further, the observer cannot easily follow the image during such vibration/jitter of the vehicle.

Additionally, there are certain human diseases which manifest themselves in tremors or palsy which induce movement in the device that make it nearly impossible for the handicapped user to view the display. Other devices that have the same disadvantage include Cathode Ray Tubes (CRT), Personal Digital Assistants (PDA), and Smart Cards.

It is noted that conventional recording system exist for correcting video camera vibrations. However, such a correction mechanism have been incorporated into image recording devices, and have not been found in image display devices and more particularly portable image display devices.

In a conventional system for motion compensation in a video recording device, the system identifies in the digitally recorded picture those elements with distinguishing characteristics. For example, objects with clean sharp edges and high contrast. Then, if those elements move, processing circuitry digitally shifts the picture to compensate for the motion.

However, this system fails to incorporate motion sensing devices (such as accelerometers) for motion compensation in a video display device or in an image other than one which is recorded. Hence, the device (e.g., video recorder) is aware of its coordinates, and extracts coordinates information from the recorded picture. Such a system is not applicable to a display undergoing physical/mechanical vibration and jitter.

Such a system for a video recording device is cannot be incorporated in a display device unless the display device is equipped with a fixed camera that can record the display device's motion and infer from the recorded image the displacement in two dimensions. Hitherto, the invention such a technique has not been performed in which motion is deduced directly for a display device being physically vibrated or moved. Additionally, such a system is very costly to manufacture.

SUMMARY OF THE INVENTION

In view of the foregoing and other problems of the conventional methods and structures, an object of the present invention is to provide a method and structure in which image vibration and jitter are compensated such that the user can readily observe the image on a display screen.

In a first aspect of the present invention, a motion compensating apparatus for a display device having a display screen, includes a device for sensing a movement of the display device, and a device for compensating for movement of the display device such that an image on the display screen of the display device remains substantially stationary in relation to an observers' gaze.

In a second aspect of the present invention, a method of compensating for motion of an image on a display device having a display screen, includes sensing a movement of the display device, and compensating for movement of the display device such that an image on the display screen of the display device remains substantially stationary in relation to an observers' gaze.

With the unique and unobvious features of the invention, a system is provided in which the mechanical vibration/jitter induced on the display device is sensed, and then the electronic image is shifted in the opposite direction to compensate for the vibration/jitter and to present a stable image to the observer's eye.

As a result, the viewed image stays stationary or near stationary relative to the observer, therefore reducing the user's eye strain.

Further, in contrast to the conventional system, the present invention is directed to motion compensation in a video display device, not in a video recording device, and incorporates motion sensing devices (accelerometers).

Additionally, unlike the conventional systems which identify in a digitally recorded picture those elements with distinguishing characteristics (e.g., objects with clean sharp edges and high contrast) and then if those elements move, processing circuitry digitally shifts the picture to compensate for the motion, the present invention is directed to an image being display as opposed to being recorded. As mentioned above, the conventional device such as a video camera, is aware of its coordinates, and extracts information from a recorded picture. In contrast, a display device does not record anything and hence is not aware of its positioning. The present invention brings this awareness into the display by measuring physical displacement in a plurality of axes (e.g., the horizontal axis and the vertical axis) of the display. The present invention deduces motion of the display device (and thus the displayed image) directly in an inexpensive and straightforward manner.

BRIEF DESCRIPTION OF THE DRAWINGS

The foregoing and other purposes, aspects and advantages will be better understood from the following detailed description of a preferred embodiment of the invention with reference to the drawings, in which.

DETAILED DESCRIPTION OF PREFERRED EMBODIMENTS OF THE INVENTION

Figure 1:
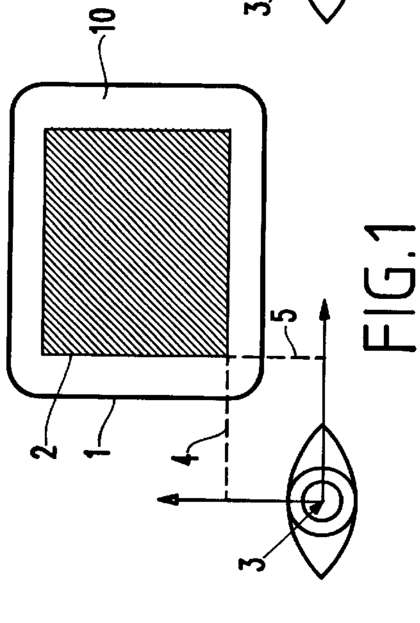
FIG. 1 illustrates a display device according to the present invention.

Referring now to the drawings, and more particularly to FIGS. 1–8E, there are shown preferred embodiments and modifications thereto of the method and structures according to the present invention. The same components in the Figures are designated with the same reference numerals for ease of understanding.

Generally, the present invention senses mechanical vibration and jitter induced on a display device displaying an electronic image thereon, and then shifts the displayed electronic image in the opposite direction to compensate for these jitters and to present a stable image to the observer's eye. As a result, the viewed image stays stationary (or substantially stationary) relative to the observer's gaze.

Turning now to the Figures, FIG. 1 illustrates a display 10 showing the function of the present invention. The display device 10 is typically formed by a liquid crystal display (LCD) or a thin-film transistor (TFT) panel, and has physical borders 1. The display can be a color display or a monochrome display. The display 10 is typically associated with (e.g., interfaced, integrally formed, or attached to) a portable device such as a palmtop/laptop computer, a video game device, a personal digital assistant (PDA), a Smart Card, etc.

An electronic image 2 is processed by a computer (e.g., a central processing unit including associated processing circuitry and the like), and is displayed on the display 10. The observer's eye reference frame 3 is in the same plane as that of the display device 10. The electronic image 2 is separated from the reference frame 3, by a horizontal direction 4 and a vertical direction 5.

Figure 2:
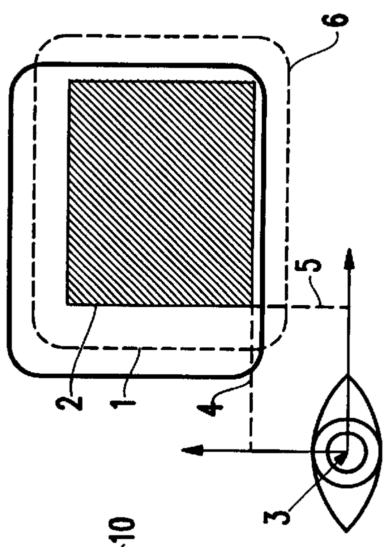
FIG. 2 illustrates a processing by the inventive structure to compensate for movement of the display of the present invention.

As shown in FIG. 2, as a result of vibrations induced on the computer, the display 10 moves up and to the left (e.g., relative to the viewing direction of FIG. 2). The location of the display 10 prior to this movement is denoted by reference numeral 6. However, the electronic circuitry detects the display motion, and compensates for it by electronically moving the displayed image 2 down and right by the same amount as the mechanical movement, thereby keeping displayed image 2 stationary with respect to the stationary reference frame (e.g., in this case the observer's eye 3). As discussed below, the image preferably is moved in a direction away from the jitter movement, so as not to be noticeable to the observer.

In a preferred embodiment, the shifted image may be truncated at the borders (e.g., peripheries), because research has shown that an observer mostly looks towards the middle of the display and only occasionally looks at the border of the display.

Truncating an image on a display is a known operation and involves deleting some pixels from one edge of the display and adding some pixels to the other edge of the display. Added pixels do not necessarily carry useful information or graphics. For example, in the case where the inventive device senses that the displayed image must be shifted down by 10 rows of pixels (e.g., in a 800-pixel×600-pixel device), the 10 rows of pixels will disappear from the bottom of the screen. Simultaneously, 10 rows of pixels will appear at the top of the screen. The newly-appearing pixels may not carry any useful graphics, but instead may be blank.

In a related embodiment, the shifted image is not truncated but a reserved area normally not visible to the user becomes visible at the borders.

Thus, alternatively, corners of the digital image may be hidden. For example, in a 800×600-pixel image, a plurality (e.g., 10) of pixels worth of rows and columns from a plurality (e.g., four) of sides of the image may be normally hidden, therefore showing only rows 11 thru 590 and columns 11 thru 790. When the displayed image is shifted in any direction, the hidden part(s) of the image now becomes visible.

Once the image is shifted, it cannot be held at that position indefinitely. Otherwise, due to truncation of the image at the borders, the truncated parts will disappear permanently. Thus, the image must be recentered. For example, if the image was shifted to compensate for motion, but was not recentered (as in the invention), it may result in certain graphical symbols (e.g., icons and the like such as MyComputer, NetworkNeighborhood, RecycleBin, in the graphical user interface of the application/operating software system, etc.) being "chopped" (deleted) from the image permanently. The image must be re-centered if the display does not come back to its prior position. Re-centering is performed slowly at a pace so that the human eye can track the image easily. Fast or slow will be defined by individual user experience. Such a re-centering period may be adjusted from a "Display Preferences" menu in a Control Panel.

Figure 3:
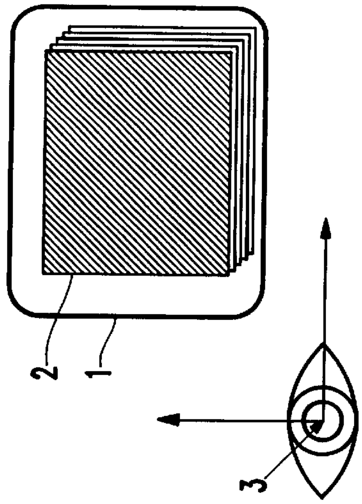
FIG. 3 illustrates a re-centering procedure performed by the structure of the present invention.

FIG. 3 illustrates the re-centering procedure. The re-centering may be performed gradually over, for example, a range of 1–10 seconds. Again, the re-centering period may be selected by the user through, for example, a "Preferences" menu of the display.

In the preferred embodiment, the mechanical movement of the display device may be detected by a pair of low-cost, small motion sensing devices such as, but not limited to, piezo-electric accelerometers. Preferably, the accelerometers are built-in to the display circuitry. Such piezo-electric accelerometers are commercially available from a number of sources. A first accelerometer of the pair of accelerometers senses a first (e.g., horizontal) motion of the display, and a second accelerometer senses a second (e.g., vertical) motion of the display.

Once the mechanical motion amount, its acceleration, and its direction is determined, a processing circuitry coupled to, or incorporated into, the display device can determine the required shift, and then the computer system's graphics circuitry redraws the display, shifting the image to compensate.

Figure 4:
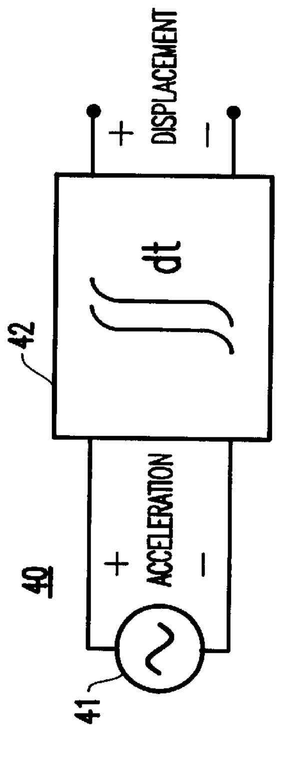
FIG. 4 illustrates principles of operation of the processing circuitry used in the present invention.

FIG. 4 illustrates principles of operation of an exemplary processing circuitry 40 according to the present invention. Specifically, FIG. 4 illustrates the principle of operation of the motion sensing by processing circuitry 40 including an accelerometer 41 and motion sensing circuitry 42.

In FIG. 4, the accelerometer 41 produces a voltage proportional to acceleration in units of volt/meter/second$^2$. Integrating this signal twice over time produces the displacement of the accelerometer 41 in units of volt/meter.

Figure 5:
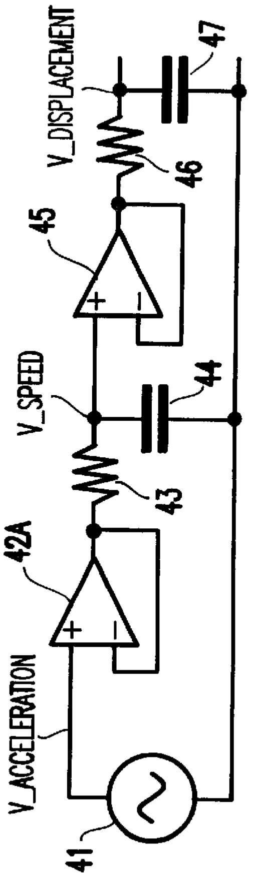
FIG. 5 illustrates an exemplary implementation of processing circuitry for reducing jitter in an image display device according to a first preferred embodiment of the present invention.

FIG. 5 illustrates an exemplary implementation of the sensing and processing circuitry 40 for the display according to a first preferred embodiment of the present invention.

In FIG. 5, an output V_acceleration from accelerometer 41 is input to a first input terminal (e.g., positive input terminal) of an operational amplifier 42A, performs a comparison with a negative feedback input (e.g., feedback input to the negative terminal of the amplifier), to provide an amplified signal output. The amplified signal is input to an RC network formed by a resistor 43 and capacitor 44. The network functions as an integrator.

The resultant signal (e.g., at the node) is proportional to V_speed, and represents the speed at which the display device 10 (and thus the image display on the display) is moving as a result of jitter, vibration or the like.

The resultant signal representing speed is input to a second integrator that includes an amplifier 45, resistor 46, and capacitor 47 that produces the output V_displacement (volt/meter) proportional to the actual mechanical displacement of the accelerometer 41. The characteristics/values of the two integrators are preferably the same. The characteristics of the components of the system can be freely selected depending upon the designer's constraints, applications, and requirements.

A pair of these signals (e.g., one for the horizontal and one for the vertical displacement) are provided according to the invention. Thus, preferably two processing circuits (e.g., one for the horizontal direction and one for the vertical direction) are provided as shown in FIG. 6 (e.g., 41V and 41H and their connected circuitry).

The signals V_displacement (for horizontal and/or vertical) must be further processed to shift the image.

Figure 6A:
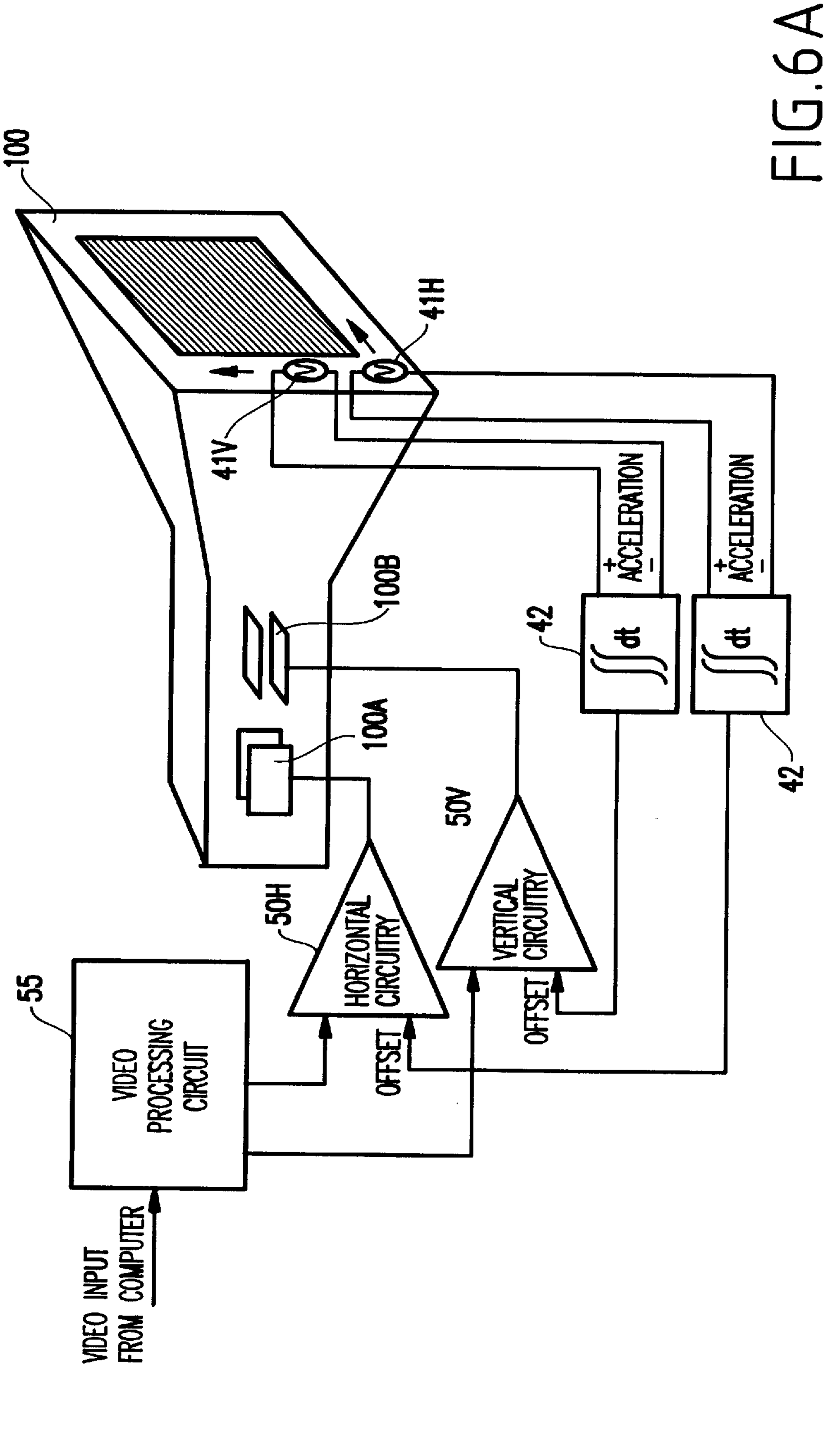
FIG. 6A illustrates a first preferred embodiment of a system for reducing jitter in an image display device according to the present invention and incorporating the inventive processing circuitry shown in FIG. 5.

In a first preferred embodiment of the invention, the analog signal may be directly fed to the cathode ray tube (CRT) circuitry, as shown in FIG. 6A.

As shown in FIG. 6A, a system for image stabilization and for performing jitter/vibration correction for the image includes horizontal and vertical sensors 41H, 41V, motion sensing circuits 42 respectively provided for the horizontal and vertical sensors 41H, 41V, and horizontal direction signal and vertical direction signal circuits 50H, 50V, preferably comprising an operational amplifier or the like, for respectively receiving at first input terminals thereof, outputs from the respective motion sensing circuits 42. The outputs from the motion sensing circuits 42 represent horizontal and vertical offsets, respectively, to be applied to the circuits 50H, 50V to move a displayed image left or right, or up or down.

Further, the horizontal and vertical circuits 50H, 50V, at second (e.g., main) input terminals thereof, receive inputs from a video processing circuit 55 representing a processed video image signal (e.g., a main signal).

Specifically, the video processing circuit 55 receives video input signals from a computer (not shown) and performs desired processing on such signals. Such a video processing circuit is well-known in the art. The main signal from the video processing circuit performs the scanning by controlling an electron beam (not shown) or the like to perform scanning. In scanning, an intensity input (not shown) etc. is provided for adjusting intensity, color (if a color display), and the like. Such a scanning operation is well-known in the art. Thus, the horizontal and vertical circuits 50H, 50V respectively provide an input, representing how an electron beam will travel, directly to inputs 100A, 100B of a cathode ray tube (CRT) 100. The input to the CRT, which may be a tube (analog) display or the like, then adjusts the image on the display screen.

The output of the horizontal circuit 50H preferably is a sawtooth waveform which moves the electron beam for forming the image left or right along the display. The output of the vertical circuit also is a sawtooth waveform which moves the beam up or down, thereby to move the image up or down on the display screen. It is noted that the period of the sawtooth of the vertical circuit 50V has a much longer period than that of the horizontal circuit 50H.

State of the art CRTs such as IBM's P70® and P200® already contain circuitry for shifting the image in vertical or horizontal direction. Dials and/or buttons generally typically exist on the front panel of these monitors to accomplish that task. The analog signals V_displacement (for horizontal and/or vertical displacement) may be added to those parts of the CRT circuitry.

Figure 6B:
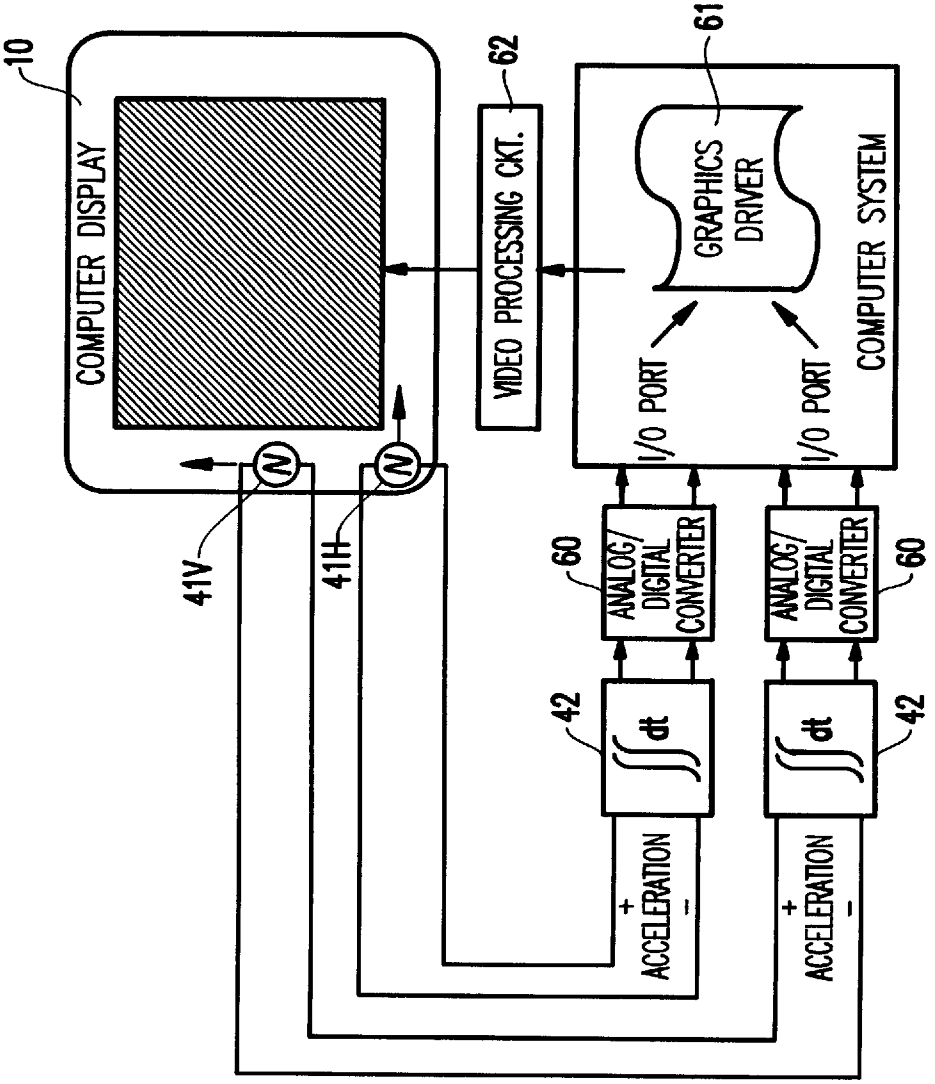
FIG. 6B illustrates a second preferred embodiment of a system for reducing jitter in an image display device according to the present invention and incorporating the inventive processing circuitry shown in FIG. 5.

In another embodiment of the invention, as shown in FIG. 6B, the analog signal V_displacement may be converted to a digital signal by an Analog-to-Digital Converter (ADC) 60. An ADC may be provided to correspond to a respective sensor, or alternatively a single ADC could be provided to receive the signals in a multiplex fashion.

Then, the digital signal becomes available to the system software, called a graphics driver 61 that controls the display 10, as shown in FIG. 6B. The graphics driver 61 feeds the digital signal to the video processing circuitry 62 of the computer which will shift the image by necessary amounts. This can be accomplished in several ways.

For example, a Cirrus Logic CL-GD542X VGA video controller chip incorporates a number of programmable registers that may be used the implement the shifting procedure by adjusting the value in Horizontal Sync Start Register moves the image horizontally on the screen. A Screen Start Address register specifies the location in display memory where data to be displayed begins. By adjusting the value of this register in multiples of horizontal scan lines, the image may be shifted vertically in either direction.

Other video controllers from other manufacturers incorporate similar registers/features that will enable shifting of the image as required by this invention.

In a related modification to the above embodiment of the invention, the digital signal obtained from V_displacement, as shown in FIG. 6B, may be fed to the operating system (OS) software (e.g., Windows95®, Windows98®, WindowsCE®, etc.), that controls the Desktop displayed on the screen. Such a modification may be performed made in software only. As opposed to programming the video controller directed as described above, the operating system will be instructed to shift the display. The OS has means to move the windows on the Desktop. The active window in the foreground is the window is most likely to be observed by the user while inactive windows are either minimized or in the background. The OS may use the digital signal to shift the active window by an amount necessary to compensate for the vibrations.

In another related embodiment of the invention, to simplify and/or reduce the cost of the image stabilization circuitry, the motion sensing and image shifting procedures may be performed only for one dimension (e.g., only for the vertical dimension).

Specifically, in some vehicles such as automobiles, the vibrations are likely to occur mostly in the vertical direction and therefore horizontal circuitry may not be necessary. Alternatively, in other vehicles the horizontal movement may be more critical in which case only the horizontal sending and compensation circuitry may be provided.

FIGS. 7A–7E illustrate signals produced by the motion sensing/compensation circuitry as a function of time for one dimension, either vertical or horizontal.

Figure 7A:
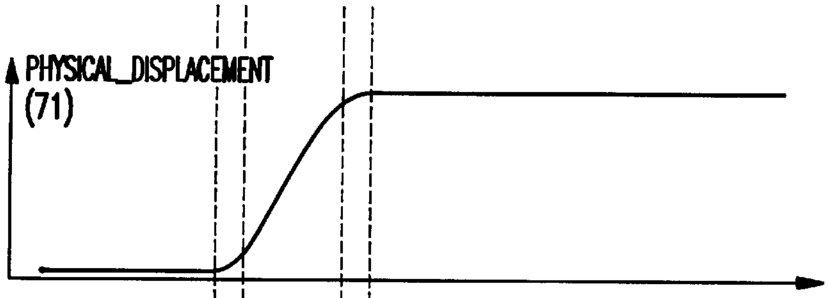
FIGS. 7A–7E illustrate characteristics of signals produced by the system of FIG. 6B as a function of time for one dimension.
Figure 7B:
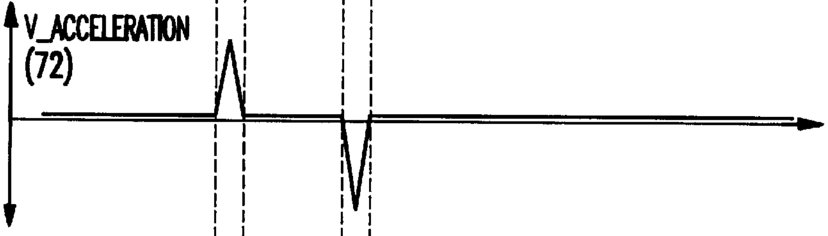
Figure 7C:
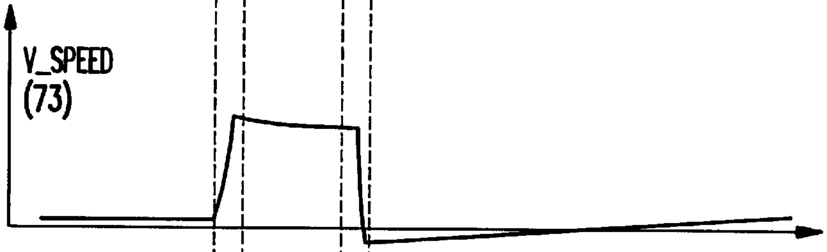

As shown in FIG. 7A, the display physically moves by a certain amount 71. The accelerometer produces the signal V__acceleration as shown in FIG. 7B (e.g., reference numeral 72). Motion sensing circuitry produces the signal V__speed proportional to the speed of the display, as shown by reference numeral 73 and FIG. 7C, and the signal V__displacement proportional to the displacement of the display is shown as reference numeral 74 and FIG. 7D.

Figure 7D:
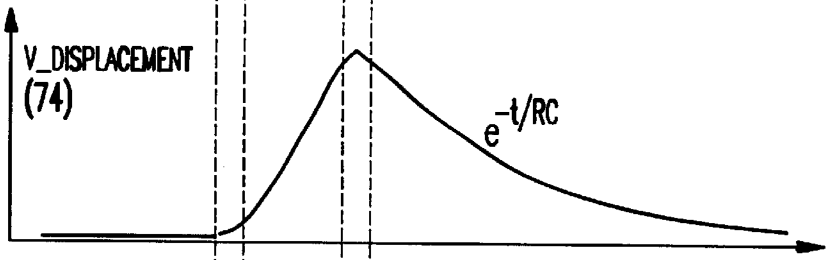

However, due to the leakage of the capacitors used in the circuitry, V__displacement will decay towards zero with a time constant RC, as shown in FIG. 7D. The RC constant is adjustable so that the decay occurs in the range of 1 to 10 seconds, i.e. at a rate that human eye can track the display. The signal V__displacement is fed to the graphics circuitry (e.g., graphics driver 61 shown in FIG. 6) of the display device 10. This is the necessary amount to shift the image to counteract the motion of the display.

Figure 7E:
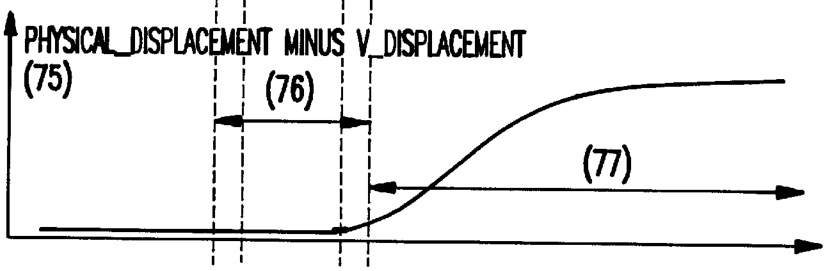

When the V__displacement signal is graphically combined with the mechanical displacement, as shown in FIG. 7E and reference numeral 75, it illustrates what the human eye will observe. That is, the display physically moves but the combined signal (e.g., reference numeral 76 in FIG. 7E) is unchanged. Thus, relative to the observer, the image did not move because the electronic image was shifted. However after 1 to 10 seconds the signal starts increasing, as shown at reference numeral 77 of FIG. 7E, to the level of the mechanical/physical displacement 71. This is the re-centering function described above. The V__displacement signal slowly tracks the mechanical displacement as intended.

FIGS. 8A–8E illustrate signals produced by this circuitry as a function of time for one dimension, either vertical or horizontal, undergoing vibration.

Figures 8A, 8B, 8C, 8D, 8E:
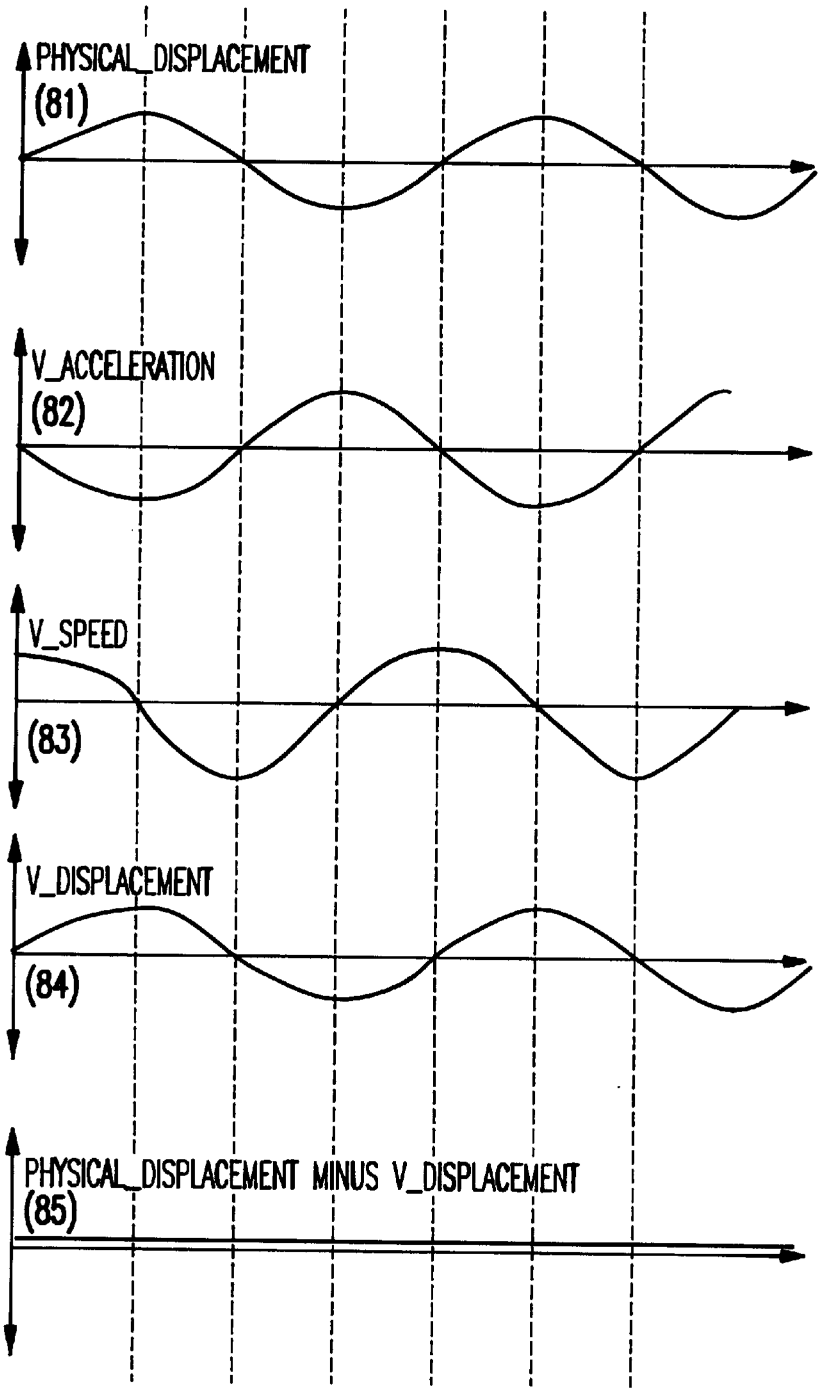
FIG. 8A–8E also illustrate characteristics of signals produced by the system of FIG. 6B and undergoing vibrations as a function of time for one dimension.

The display 10 is mechanically oscillating, as illustrated by a sinusoidal wave 81 in FIG. 8A. Thus, the accelerometer produces the corresponding signal V__acceleration (2). Motion sensing circuitry produces the signal V__speed proportional to the speed of the display, as shown in reference numeral 83 in FIG. 8C. It also produces the signal V__displacement proportional to the mechanical displacement of the display, as shown in FIG. 8D at reference numeral 84.

When this signal is combined graphically, as shown at reference numeral 85 in FIG. 8E, with the mechanical displacement of the display, the combined signal represents what the human eye will observe. That is, the display physically oscillates as shown at 81, but the combined signal 85 (what the viewer sees) is unchanged. Thus, relative to the observer, the image does not move because the electronic image 84 is also oscillating to compensate for the mechanical/physical oscillation.

In a related embodiment, suitable for an environment with long periods of relatively constant acceleration, such as aircraft avionics, naval vessels, etc., an anti-biasing circuit may be added to compensate for this constant acceleration.

While the invention has been described in terms of several preferred embodiments, those skilled in the art will recognize that the invention can be practiced with modification within the spirit and scope of the appended claims.

What is claimed is:

1. An image stabilizing apparatus for a display device having a display screen, said apparatus comprising:

a sensing circuit comprising at least one accelerometer, for sensing a movement of said display device;

a processing circuit which processes a signal from said sensing circuit and outputs a displacement signal; and a movement compensation circuit which causes an image on said display screen to be adjusted based on said displacement signal such that said image remains substantially stationary in relation to an observer's gaze, wherein said movement compensation circuit combines said displacement signal with another signal to cause said image to be gradually returned to an original position on said display screen, and wherein said movement compensation circuit truncates said image at its periphery by deleting pixels at one edge of said image and adding pixels at another edge of said image.

2. The apparatus according to claim 1, wherein said sensing circuit senses at least one of physical movement in a horizontal direction and physical movement in a vertical direction.

3. The apparatus according to claim 1, wherein said at least one accelerometer comprises a plurality of accelerometers for respectively sensing movement in a plurality of predetermined directions.

4. The apparatus according to claim 1, wherein said movement compensation circuit electronically moves said image on said display screen by a same amount as said movement of said display device.

5. The apparatus according to claim 4, wherein said movement compensation circuit moves said image on said display screen in a direction opposite to said movement of said display device.

6. The apparatus according to claim 1, wherein said movement compensation circuit returns said image on said display screen after a predetermined time period.

7. The apparatus according to claim 6, wherein said predetermined time period comprises a period substantially within a range of about 1–10 seconds.

8. The apparatus according to claim 6, wherein said predetermined time period is selectively adjusted by a user.

9. The apparatus according to claim 1, wherein said sensing circuit is built into said display device.

10. The apparatus according to claim 1, wherein said at least one accelerometer comprises a plurality of accelerometers for sensing movement of said display device in a horizontal direction and a vertical direction.

11. The apparatus according to claim 10, wherein said accelerometers comprise piezo-electric accelerometers.

12. The apparatus according to claim 1, wherein said processing circuit further comprises:

an operational amplifier for receiving, from said at least one accelerometer, an output representing acceleration of said display device; and a first resistor-capacitor network, coupled to receive an output of said operational amplifier, for determining a speed of said movement of said display device.

13. The apparatus according to claim 12, wherein said processing circuit further comprises:

a second resistor-capacitor network, coupled to said first resistor-capacitor network, for generating a vertical displacement signal and a horizontal displacement signal.

14. The apparatus according to claim 13, wherein said display device further comprises a cathode ray tube (CRT), and wherein said vertical and horizontal displacement signals directly adjust a video image signal which is input to said CRT.

15. The apparatus according to claim 1, wherein said processing circuit comprises:

an analog-to-digital converter for converting said displacement signal into a digital signal.

16. The apparatus according to claim 15, wherein said movement compensation circuit comprises:

a graphics driver for said display device, wherein said digital signal is input to said graphics driver for controlling said display device, and wherein said graphics driver feeding said digital signal to a video processing circuit of said display device for shifting said image.

17. The apparatus according to claim 15, wherein said digital signal is input to an operating system software of a computer interfaced with said display device.

18. An image stabilizing apparatus for a display device having a display screen, said apparatus comprising:

sensing means comprising at least one accelerometer, for sensing a movement of said display device; and compensating means, operatively coupled to said sensing means, for compensating for said movement of said display device such that an image on said display screen of said display device remains substantially stationary in relation to an observer's gaze, wherein said movement compensation circuit combines said displacement signal with another signal to cause said image to be gradually returned to an original position on said display screen, and wherein said movement compensation circuit truncates said image at its periphery by deleting pixels at one edge of said image and adding pixels at another edge of said image.

19. A display device comprising:

a display screen; and an image stabilizing apparatus for stabilizing an image on said display screen, said image stabilizing apparatus comprising:

a sensing circuit comprising at least one accelerometer, operatively coupled to said display screen, for sensing a movement of said display device;

a processing circuit comprising:

an first network comprising an operational amplifier, resistor and capacitor which inputs an acceleration signal from an accelerometer; and outputs a speed signal; and a second network comprising an operation amplifier, resistor and capacitor which inputs said speed signal and outputs a displacement signal; and a movement compensation circuit which causes an image on said display screen to be adjusted based on said displacement signal such that said image remains substantially stationary in relation to an observer's gaze, wherein said movement compensation circuit combines said displacement signal with another signal to cause said image to be gradually returned to an original position on said display screen, and wherein said movement compensation circuit truncates said image at its periphery by deleting pixels at one edge of said image and adding pixels at another edge of said image.

20. A method of stabilizing an image on a display device having a display screen, said method comprising:

sensing a movement of said display device using at least one accelerometer;

processing a signal from said at sensing circuit to generate a displacement signal; and adjusting an image on said display screen to compensate for said movement of said display device by using said displacement signal to adjust a video image signal, wherein said displacement signal is combined with another signal to cause said image to be gradually returned to an original position on said display screen, wherein an image on said display screen of said display device remains substantially stationary in relation to an observer's gaze, and wherein said image is truncated at its periphery by deleting pixels at one edge of said image and adding pixels at another edge of said image.

* * * * *